United States Patent [19]
Atalla

[11] 4,138,058
[45] Feb. 6, 1979

[54] CARD, SYSTEM AND METHOD FOR SECURING PERSONAL IDENTIFICATION DATA

[75] Inventor: Martin M. Atalla, Portola Valley, Calif.

[73] Assignee: Atalla Technovations, Sunnyvale, Calif.

[21] Appl. No.: 824,260

[22] Filed: Aug. 15, 1977

Related U.S. Application Data

[63] Continuation-in-part of Ser. No. 813,882, Jul. 8, 1977.

[51] Int. Cl.² ........................... G06K 5/00; G06K 7/10
[52] U.S. Cl. ...................................... 235/380; 235/473
[58] Field of Search ............... 235/487, 488, 492, 379, 235/380, 381, 382; 340/149 A

[56] References Cited

U.S. PATENT DOCUMENTS 3,728,521   4/1973   Borough et al. ..................... 235/488
3,928,750   12/1975   Wolflingseder ..................... 235/441

*Primary Examiner*—Daryl W. Cook
*Attorney, Agent, or Firm*—A. C. Smith

[57] ABSTRACT

A card having randomly-oriented optical fibers, and a system having a card reader for reading the card and having a keyboard for entering secret user-identification data, are disclosed for securing the user-identification data entered into the system. The system includes a logic unit for controlling the keyboard, and for applying data to the card via the card reader. The system also includes a physical data collector or transducer for collecting fingerprint or voice print data, or the like, from a user and applying said data, in digital form, to the card via the logic unit and the card reader. The card operates in conjunction with the logic unit of the system to transform the applied data and to improve the security of said data. A method of fabricating said card and a method of securing entered data using said card are also disclosed.

8 Claims, 6 Drawing Figures

ARRAY OF INPUT SOURCES    INPUT ENDS   OUTPUT ENDS    ARRAY OF DETECTORS

INPUT                                 OUTPUT

CARD, SYSTEM AND METHOD FOR SECURING PERSONAL IDENTIFICATION DATA

RELATED APPLICATION

This is a continuation-in-part application of U.S. patent application Ser. No. 813,882, filed on July 8, 1977, entitled CARD, SYSTEM AND METHOD FOR SECURING USER IDENTIFICATION DATA.

BACKGROUND OF THE INVENTION

Many types of transaction cards (account cards, identification cards and the like) have been used by individuals to gain access to account files in a bank or similar institution, to gain access to secure areas, or to initiate some similar transaction enabling them to access otherwise restricted information stored in the institution. Not infrequently, the person using the card is not the person to whom the card was issued (i.e., not an authorized user of the card), but a person who has found, stolen, or manufactured (perhaps duplicated) the card with the intent to use it to defraud a bank or similar institution out of thousands, or perhaps even millions of dollars.

Heretofore, relevant information such as account number or code, employee number, social security number and the like, have been readily recorded or otherwise included on the card (i.e., embossed, magnetically or optically encoded on the card). A card of this type, and a system which utilizes such a card, are shown, for example, in U.S. Pat. No. 3,862,716, entitled "Automatic Cash Dispenser and System and Method Therefor," issued Jan. 28, 1975 to Robert Black and Christopher Hall.

Because of the dire consequences (i.e., loss of thousands, even millions of dollars by banking and other institutions) that could be occasioned if the security of such a card-utilizing system is breached by an unauthorized card user, a more secure card and system which would make the probability of said breach more remote would not only be useful, but very desirable. What is needed, therefore, is a card (and a system for utilizing the card) which actively contributes to the security process, i.e., a card that aids the system in securing data entered into the system, rather than merely passively reproducing prerecorded data when read.

SUMMARY OF THE INVENTION

Thus, in accordance with the preferred embodiment of the present invention, a card is provided having a plurality of optical fibers embedded in a substrate, one end of the fibers being disposed in a first pattern along one edge of the card to form a first port, and the other end of the fibers being disposed in a second pattern along another edge of the card to form a second port.

Also provided, is a method of producing said card, and a system which utilizes said card to improve user identification and transaction security. The system comprises an optical reader with light-emitting diode (LED) signal sources, and detectors, a keyboard unit, and a processor or logic unit (including circuits for driving the LED signal sources). Input data applied to the card, via the logic unit and the signal sources, are transformed by the card from a form consistent with the first pattern to a form consistent with the second pattern. The card, thus, actively serves to improve the security of the system and, hence, user identification and transaction security.

The system includes a physical data collector or transducer for collecting fingerprint or voice print data or signature characteristics, or the like from a user and applying said data, in digital form, to the card via the logic unit and the card reader.

DESCRIPTION OF THE PREFERRED EMBODIMENT

Figure 1:
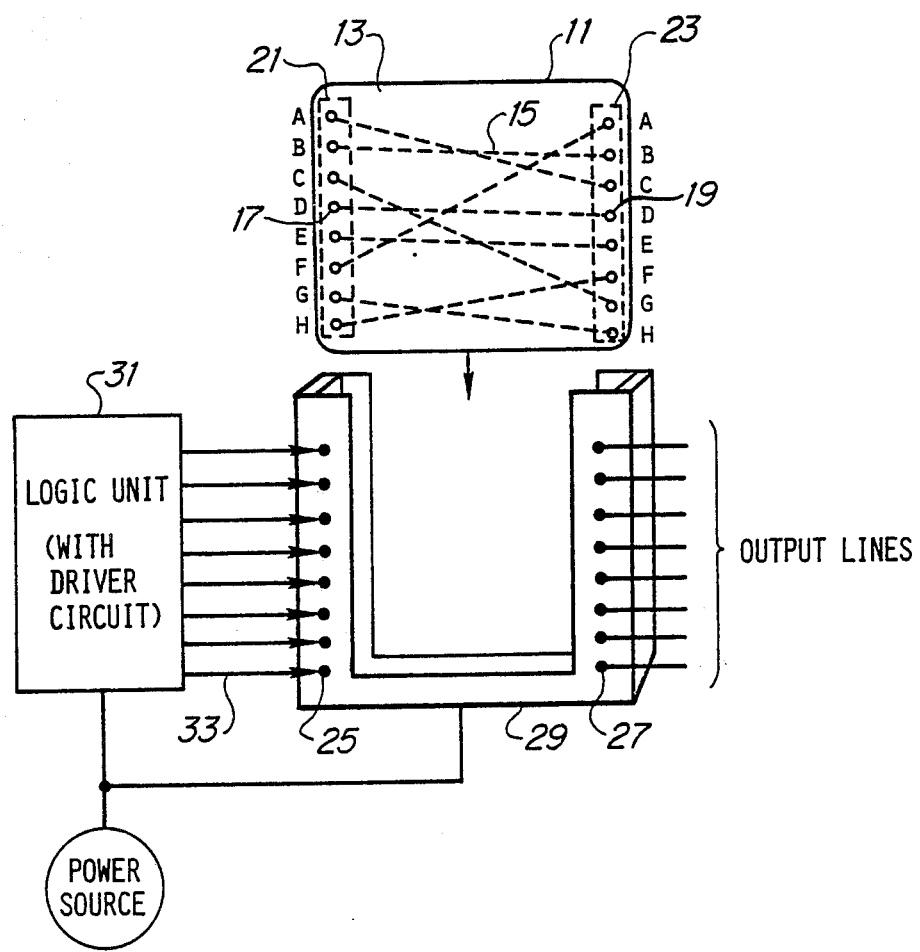
FIG. 1 is a schematic diagram of a card of the present invention, and of a card reader for reading said card.

Referring now to FIG. 1, there is shown a card 11 of the present invention. The card may be produced by moulding an opaque plastic material (such as opaque fiberglass reinforced nylon plastic, or Acrylonitrile Butadiene Styrene plastic, having an index of refraction which minimizes light diffusion therethrough) to form a non-light-conductive substrate portion 13, and interlaying or embedding into the substrate portion, while molten, a selected number of optical fibers 15 (e.g., coated plastic or glass fibers, five or less inches in length, having a selected index of refraction and light attenuation capabilities) such that only the ends of the fibers are visible at a surface of the substrate portion, i.e., only the ends of the fibers are visible at the front or rear surface or at selected edges of the card. Alternatively, the optical fibers may be laid out in a selected pattern in a mold cavity, after which the opaque plastic material is injected into the mold cavity forming a substrate surrounding and covering the fibers, and exposing only the ends thereof at a surface of the substrate. Each fiber is shown having two ends 17, 19, one group of ends 17 being disposed collectively along one edge of the card 11, forming an input port 21, the other group of ends 19 being disposed collectively along another edge of the card 11, forming an output port 23. The fibers 15 are oriented randomly in substrate 13, ends 19 at the output port 23 being positioned to form a pattern different from that formed by ends 17 located at the input port 21. As shown in FIG. 1, each input and output end 17, 19 is uniformly spaced along the edges of the card 11 so as to properly mate with corresponding light sources 25 and detectors (e.g., photo diodes) 27 of an optical card reader 29 when the card 11 is properly inserted into the reader 29. When properly inserted, light impulses from an LED of light source 25 is guided to a matching input end 17 (and is shielded from other input ends), and light from an output end 19 is guided to a matching detector 27 (and is shielded from other detectors).

In using the card 11 to initiate a transaction (e.g., to communicate a withdrawal or credit transaction to a computer system of a bank), the card-holder (user) first inserts the card 11 into optical card reader 29 of the system in a manner such that the input ends 17 become positioned directly under corresponding LED light sources 25, and the output ends 19 become positioned directly under corresponding detectors 27.

Figure 2:
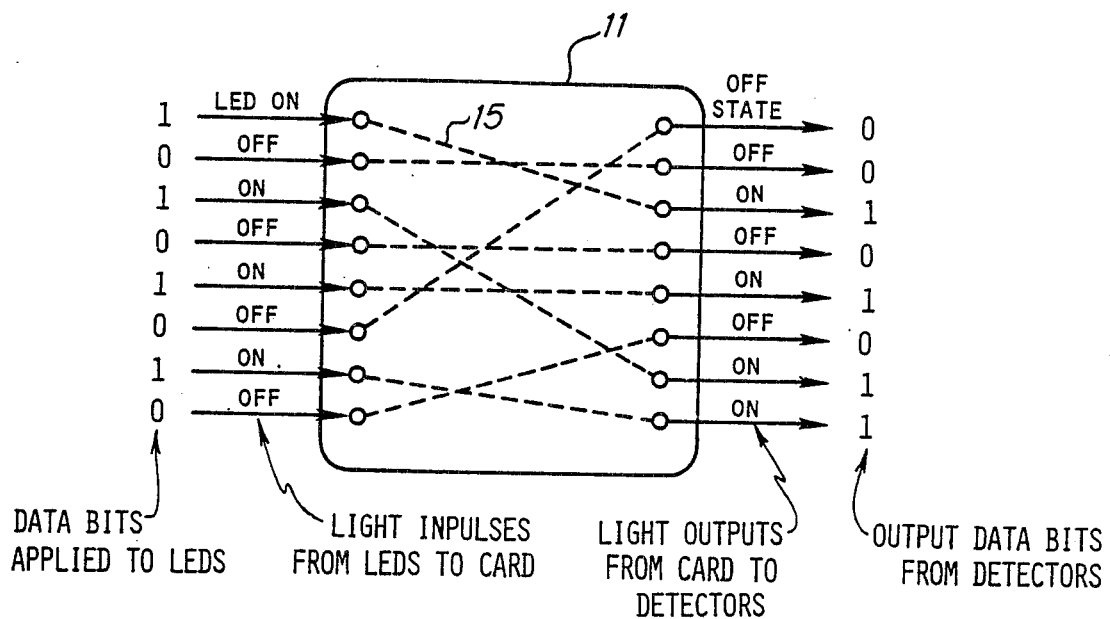
FIG. 2 is a schematic diagram of the card of FIG. 1 in greater detail.

Data in the form of binary bits from a processor or logic unit 31 are applied via input lines 33 to LED light sources 25, a data bit of "1" causing a respective LED to be turned "on," and a data bit of "0" causing the LED to be turned "off." When card 11 is properly inserted into reader 29 and the LED light sources 25 are energized to "on" and "off" states corresponding to applied data bits as shown in FIG. 2, card 11, by virtue of the orientation of its optical fibers (i.e., by virtue of the way in which the fibers' end points are connected: A-C, B-B, C-G, D-D, E-E, F-A, G-H, H-F, as shown in FIG. 1), transforms or changes the pattern of the applied data bits to a different output pattern.

In general, for a card having N optical fibers embedded therein, where each fiber has an input end and an output end for receiving and outputting light impulses corresponding to N bits of data, as many as N factorial (N!) unique combinations (patterns) are possible. Even if only sixteen optical fibers were embedded in the card, however, as many as 16! (approximately twenty trillion) unique combinations would be possible, sufficient to provide each user with a unique card, i.e., a card with unique configuration of fibers.

Instead of optical fibers described above, it is understood that other types of signal conducting channels such as acoustic tubes or devices, semiconductor circuits or wires or any such signal-translating means may be used. Where metal conductors or wires are used, they may be insulated prior to being embedded in the substrate. Also, the ends of the metal strands may be fabricated to form contact pads for capacitive coupling to or intimate contact with an electrical signal source (i.e., binary pulse signal source) at one edge of the card and an output signal sensor (detector) at another edge of the card.

Figure 3G:
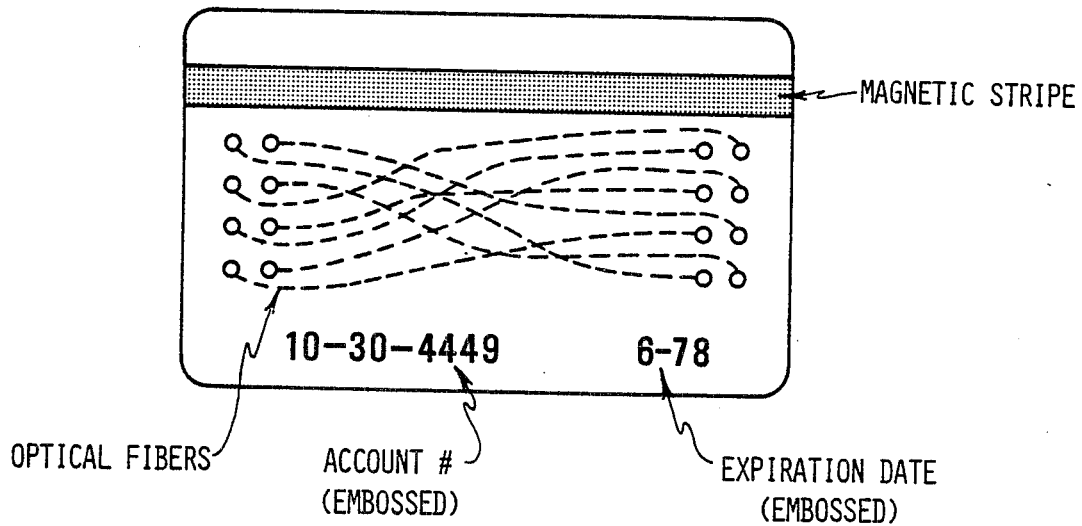
FIGS. 3A–3G are schematic diagrams of cards representing alternative embodiments of the card of FIG. 1.
Figure 3A:
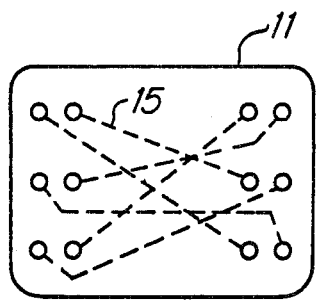
Figure 3B:
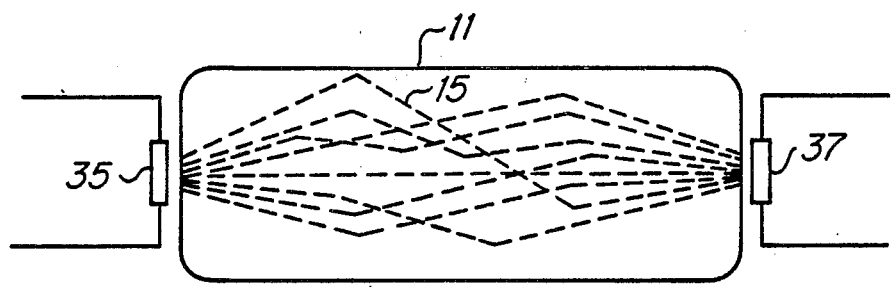
Figure 3C:
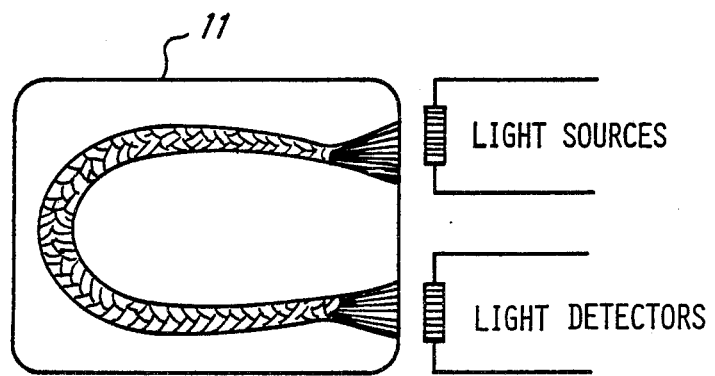
Figure 3D:
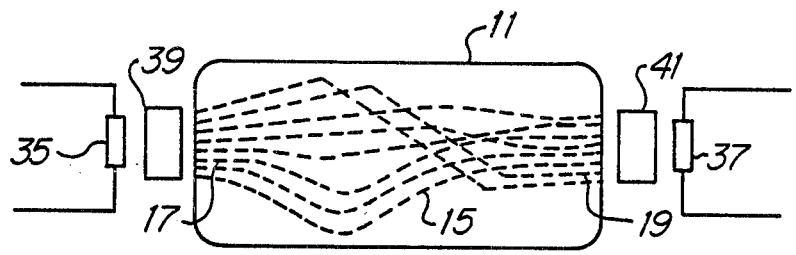

Various alternative card configurations are shown in FIGS. 3A–G. FIG. 3A, for example, shows a card 11 having its fibers oriented such that the input and output ends of the fibers 15 form a two-dimensional input array and a two-dimensional output array, respectively, for greater flexibility in arrangement of matching signal sources and detectors (sensors). FIG. 3B shows another card configuration where the ends of the fibers 15 converge so as to register or mate with selected semiconductor LSI (large scale integrated circuit) chips, for example, monolythic or hybrid integrated arrays of light sources 35 and monolythic or hybrid integrated arrays of detectors 37. FIG. 3D shows a card configuration which employs a pair of lenses 39, 41 or other optical system, for convergingly or divergingly coupling light from light source array chip 35 to the input ends 17 of the fibers 15 of the card 11, and convergingly or divergingly coupling light from the output ends 19 of the fibers 15 to detector array chip 37.

Figure 3E:
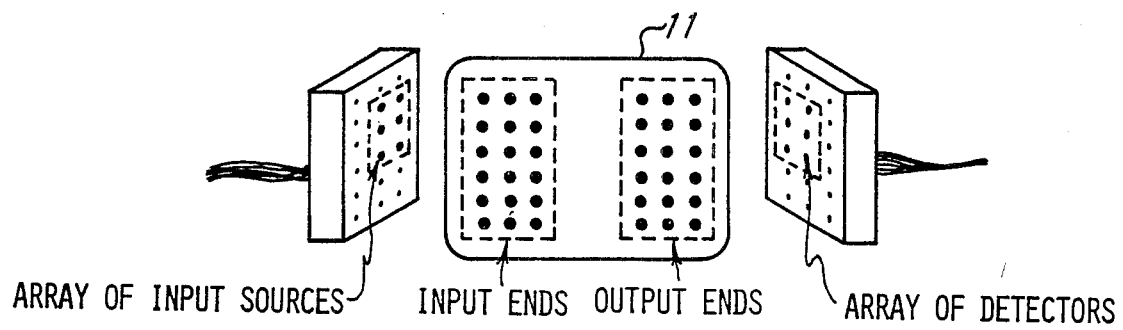

Heretofore, card configurations have been described where the number of input or output ends of the fibers in the card matches the number of input sources or detectors. As shown in FIG. 3E, however, the number of input sources or detectors may be less than the number of input or output ends of the fibers. This provides additional randomness to the card's configuration and, hence, provides additional security in the use of the card, by having output signals produced by the card not only depend on the random pattern or orientation of the fibers in the card, but also depend on the geometrics of the input source array and the detector array.

Figure 3F:
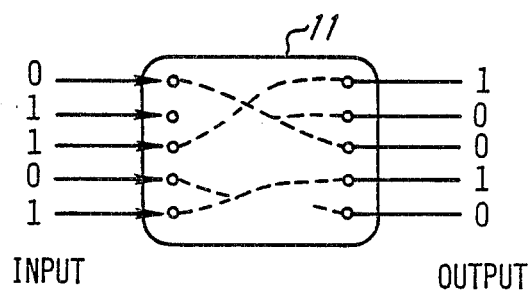

Certain cards, such as that shown in FIG. 2, possess a repeatability (reversibility) feature, permitting input data applied to the input port of the card to be reproduced or repeated, by applying the output data back into the output port of the card. For example, if the output data bits shown in FIG. 2 were applied back into the output port of the card, the data bits produced at the input port of the card would match the data bits originally applied at that input port. FIG. 3F shows a card configuration which, optionally, eliminates this repeatability feature. As shown in FIG. 3F, a fiber may have no input ends and one or more output ends, or may have one or more input ends connected to no, one, or more than one output ends. Thus, if the output bit pattern "10010" is applied back into the output port of card 11 (FIG. 3F), the bit pattern that would be reproduced at the input end would be "00111," not "01101". (Such non-repeatability is always achievable whenever a "1" bit or "on" state is applied to each input end that is unconnected to an output end.)

In applications where data not directly related to security (e.g., institution address, account number, expiration date, etc) are encoded on the card, for example, encoded on magnetic strips as shown in FIG. 3G, the security feature of the card described above may be enhanced by such data, as described following.

Figure 4:
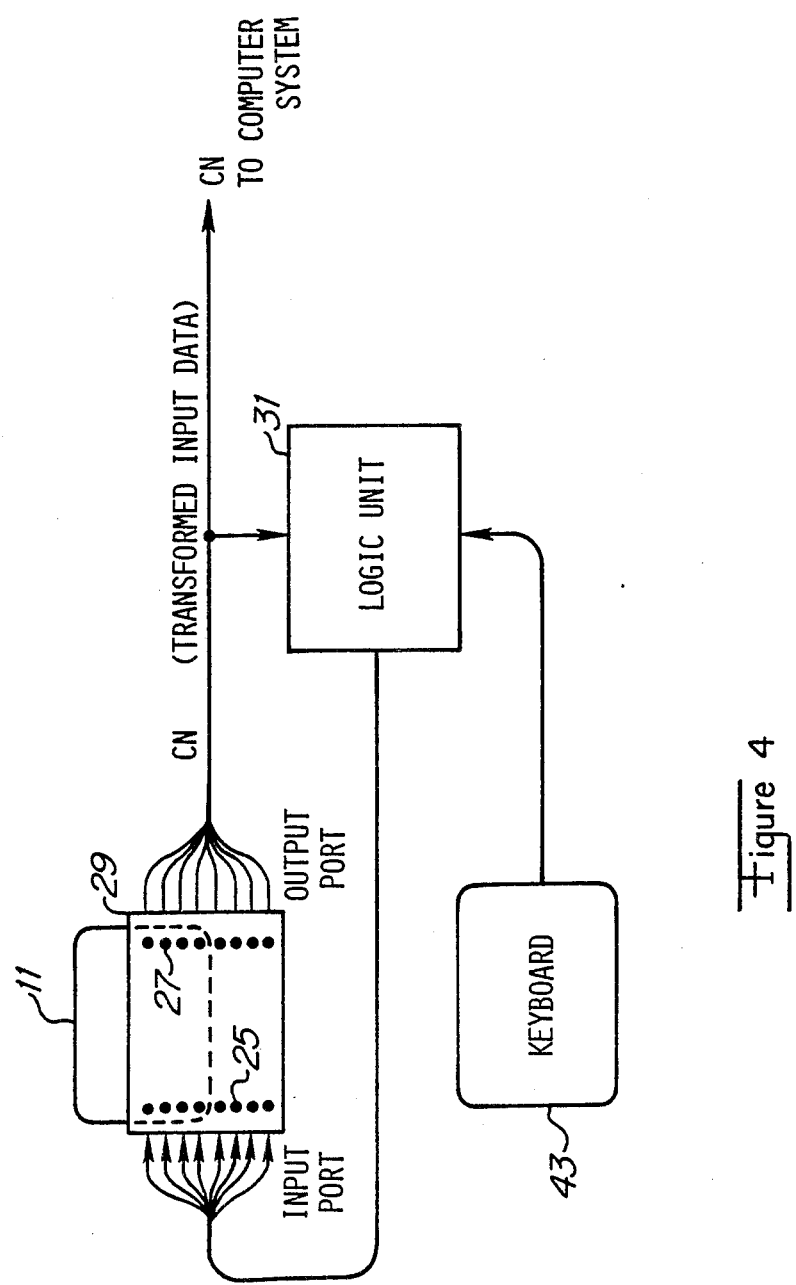
FIG. 4 is a combined schematic and block diagram of the card of FIG. 1 and of a system of the present invention, including the card reader of FIG. 1, for processing said card.

In addition to the above-described cards, a system is provided, as shown in FIG. 4, with which the cards may be used to secure user-identification data entered into the system by a card holder or use. The system of FIG. 4 comprises a keyboard 43, a card reader 29 for reading a card 11, and a processor or logic unit 31 for storing and processing data entered via the card reader and keyboard, and producing therefrom a secure user-identification code.

In response to card 11 being inserted into reader 29, logic unit 31 produces a card number (CN) identifying the card by applying a fixed, preselected input bit pattern (e.g., an eight-bit pattern of "10101010") to the LEDs 25 at the input port of reader 29, causing the LEDs to turn "on" and "off," corresponding to the input bit pattern. The "on" LEDs apply light impulses to corresponding (matching) optical fiber ends at the input port of the card, causing the fibers of the card to transform the "on-off" pattern of the applied light impulses and produce therefrom, at the output port of the card, an output pattern of light impulses different from the applied input pattern. The detectors 27 sense the output pattern of light impulses and produce a corresponding output bit pattern representing a unique card number (CN) identifying the card 11.

The card number (CN) is regarded as being sufficiently unique for purposes of securely identifying an institution's card users as described hereinbefore, because for a card having N fibers, each with one input and one output end, the probability would be small that another card would produce the same CN; this probability (P), it is believed, may be expressed as follows:

$$p = 1/N \rightleftharpoons /2^n$$

where N! represents the number of unique cards produceable (each card having a unique configuration of N fibers), and $2^n$ represents the number of unique output bit patterns (CN) produceable by a fiber-embedded card having N output ends.

Thus, for a 16-bit card (i.e., a card having 16 fibers each with one input end and one output end), it is believed that the probability would be about $1/10^8$ that another card would produce the same CN in response to a preselected, fixed input bit pattern. It is significant to note, therefore, that having knowledge of the card number CN is not sufficient to determine the detailed structure of the card.

Figure 5A:
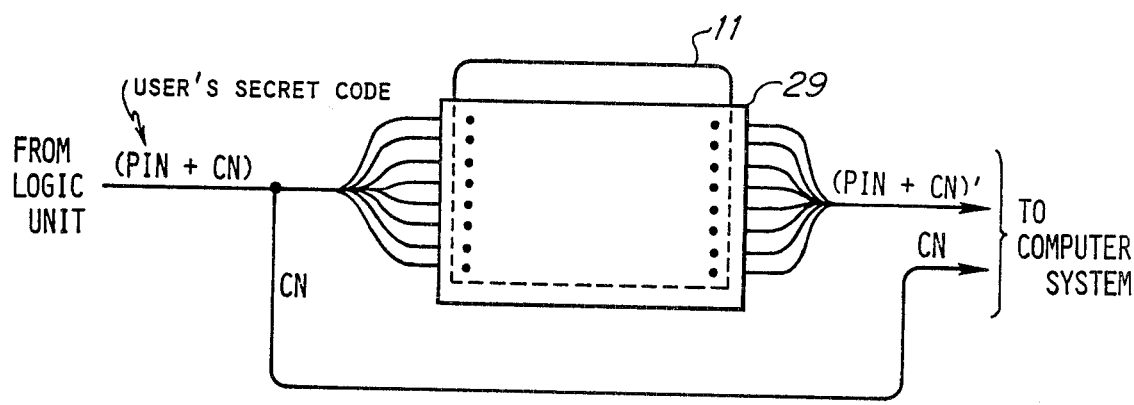
FIG. 5A is a schematic diagram of the card and card reader of FIG. 1 showing a selected data transformation operation.

In addition to producing a unique card number (CN), the system of FIG. 4 provides for entry of a user's secret code (a code or personal identification number known only to the user or person making the transaction) into the system. After inserting his card 11 into reader 29, the user enters his secret code into the system via keyboard 43. In response to the inserted card, logic unit 31, in conjunction with card 11 and card reader 29, produces a unique card number (CN) as described above, and stores the CN in buffer memory in the logic unit 31. Thereafter, upon entry of the user's secret code (Personal Identification Code, PIN), logic unit 31 applies both the CN and the PIN (sequentially, interdigitally, or in parallel) to card reader 29 and card 11, as shown in FIG. 5A. Card 11 transforms the applied data (PIN + CN) to an encrypted form (PIN + CN)' in a manner consistent with the orientation of its fibers. This transformed or encrypted data (PIN + CN)' is then transferred to a computer system of the institution (e.g., bank) where it is compared with pre-stored data for verifying the correctness of the transformed (PIN + CN) and, hence, the correctness of the entered PIN (user's secret code) and of the card (fiber pattern) used.

Figure 5B:
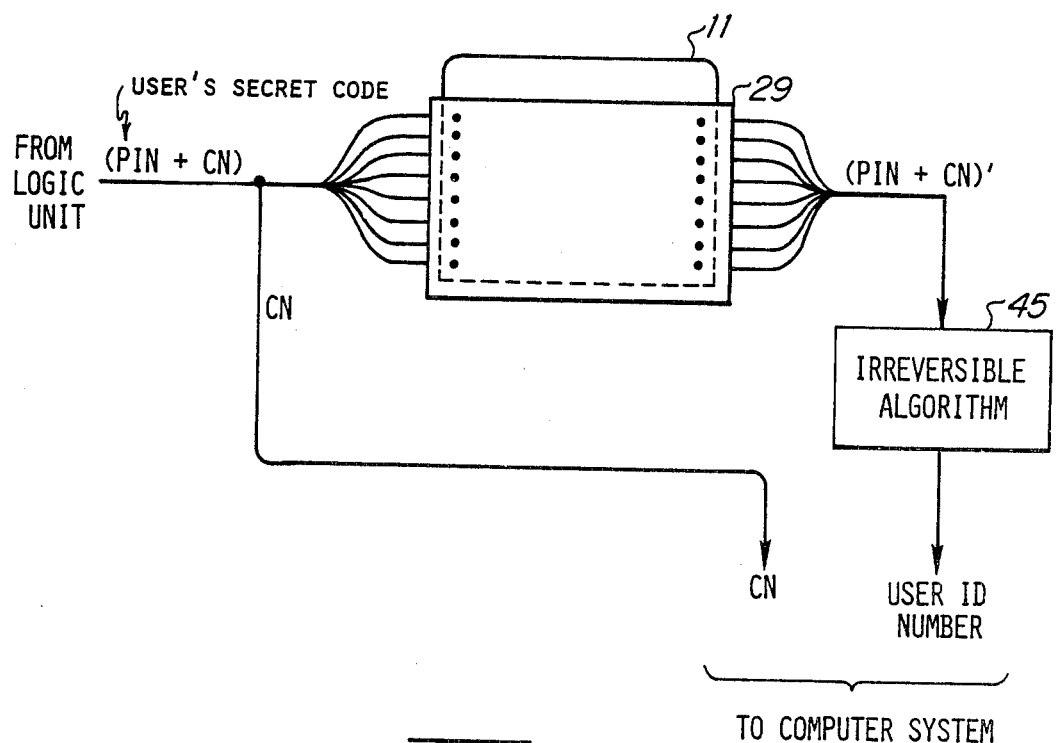
FIG. 5B is a combined schematic and block diagram of the card and card reader of FIG. 5A, and of a selected algorithm for performing selected, irreversible data transformation operations.

In FIG. 5B, an irreversible algorithm unit 45 (such as encoding scheme described, for exampe, in U.S. Pat. No. 3,939,091, entitled "Personal Verification System" issued Feb. 10, 1976, to Martin M. Atalla and Alexander F. Liu or, for example, the National Bureau of Standards encryption-decryption integrated circuit chip commercially available from Motorola Company) is included in the system for receiving the transformed (PIN + CN)' data and producing therefrom a user ID (identification) number. Irreversible algorithm unit 45, which may represent the institution's own ID or its computer system's ID, increases the security of the system by making the process of producing an ID number from a transformed (PIN + CN)', irreversible (i.e., making it impossible to reproduce the transformed (PIN + CN)' from the ID number, using unit 45). For added security, the transformed (PIN + CN)' may be combined with the generated card number CN or with a user account number or some other identification data, prior to its application to irreversible algorithm unit 45.

Figure 6:
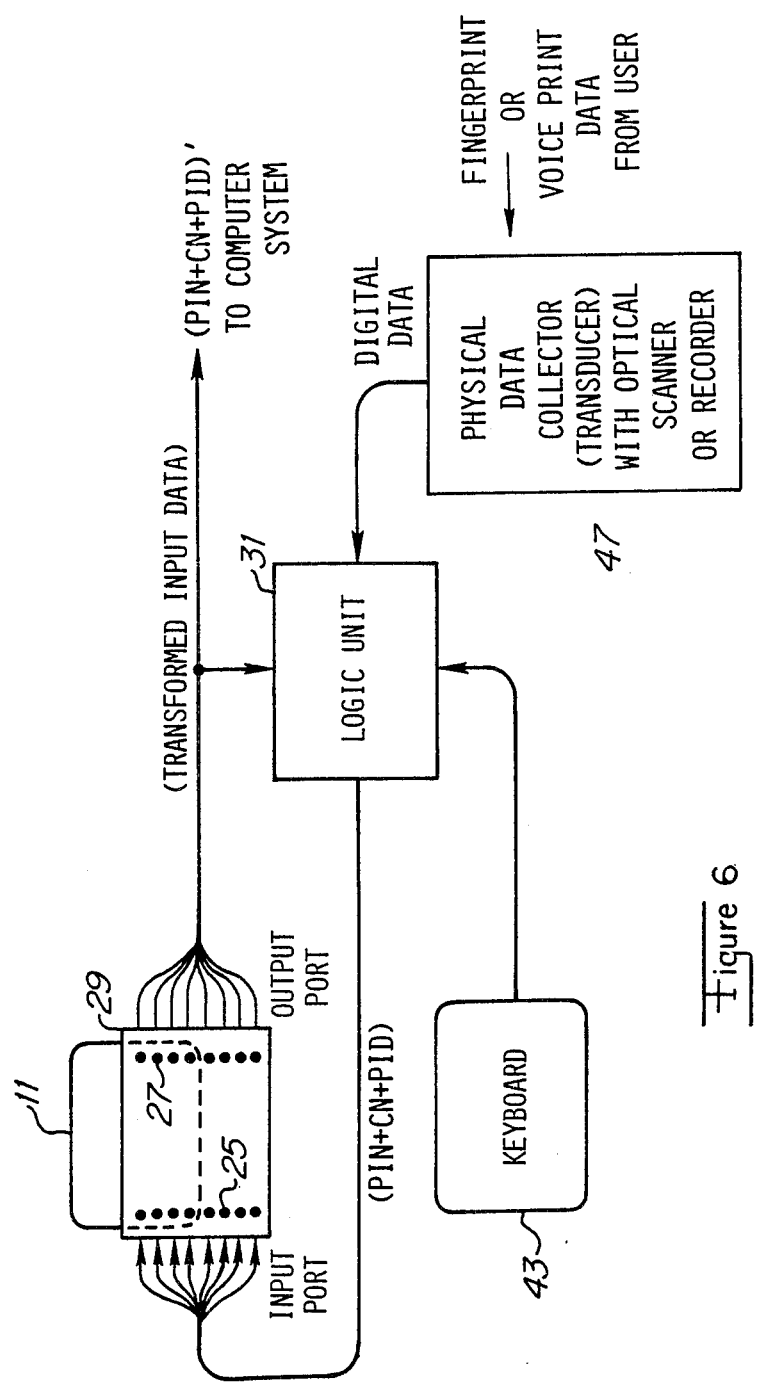
FIG. 6 is a combined schematic and block diagram of the card and system of FIG. 4 including a data collector for entering fingerprint or voice print data into the system.

An alternative embodiment of the system of the present invention is shown in FIG. 6. To provide still greater security of user-identification data entered into the system, and ensure successful use of the system by authorized users only, a physical data collector 47 is included in the system for receiving physical data from the user, i.e., Physical Identification Data (PID) such as fingerprint, voice-print and the like that are unique to the user.

The physical data collector 47 may be a commercially available transducer with optical scanning and detecting capabilities for scanning and detecting a user's fingerprint and converting said fingerprint to digital form for application to card reader 29 and card 11 via logic unit 31. Alternatively, collector 47 may be a commercially available voice-print recorder capable of recording and generating a voice print of the user's voice and converting said voice-print recording to digital form for application to card reader 29 and card 11 via logic unit 31. Also, the physical data collector 47 may be a conventional signature digitizer or similar conventional transducer which operates on the dynamics of a user signing his name. As shown in FIG. 6, logic unit 31 may combine the CN (card number representing the fiber pattern of the card) and PIN data (the user's secret code described hereinbefore) with the PID digital data, by applying one or more of the CN, PIN and PID digital data, alone or in combination (sequentially, interdigitally, or in parallel), to card reader 29 and card 11. Card 11 transforms the applied data (e.g., PIN + CN + PID) to an encrypted form (PIN + CN + PID)' in a manner consistent with the orientation of its fibers. This transformed or encrypted data (PIN + CN + PID)' is then transferred to the computer system of the institution, where it is compared with pre-stored data verifying the correctness of the transformed PIN', CN' and PID' and, hence, the correctness of the entered PIN in conjunction with the card used, and with the particular user as identified by the PID representing the user's fingerprint or voice-print, or signature, or the like.

Alternatively, the PIN data may be omitted and the applied data for encryption becomes (PID + CN) which is transformed via the card 11 and reader 29. This transformed or encrypted data (PID + CN)' is then transferred to the computer system of the institution, for example, via an irreversible algorithm of the type referred to at 45 in FIG. 5B. The transformed data may then be compared with prestored data for verifying the correctness of the transformed data in a manner as previously described.

Thus, from the foregoing description of the optical-fiber card and system for utilizing said card, a unique method and means are presented for securing user identification data.

I claim:

1. A system for securing entered user-identification data utilizing a card having signal channels arranged in a selected pattern for transforming entered data, the system comprising:

data entry means for entering user-identification data;

logic means coupled to the data entry means for storing the entered user-identification data and for producing input data including selected data and the user-identification data; and card reader means coupled to the logic means for receiving said card, and responsive to said input data for applying input signals to the card and receiving output signals from the card representing transformed user-identification data.

2. The system as in cliam 1 wherein the data entry means is a transducer disposed for collecting fingerprint data and applying said data in digital form to the logic means.

3. The system as in claim 1 wherein the data entry means includes a voice-print recorder disposed for recording voice-print data and applying said data in digital form to the logic means.

4. The system as in claim 1 wherein the data entry means includes signature transducer means disposed to apply data concerning user's signature to the logic means.

5. A method of securing user-identification data entered into a system utilizing a card having signal channels arranged in a selected pattern, the method comprising the steps of:
obtaining physical identification data pertaining to the user;
providing a card number representative of the selected pattern of signal channels in the card; and
applying the card number and the physical identification data to the card, and producing therefrom transformed data including transformed physical identification data.

6. The method of claim 5 comprising the additional step of entering user-identification data; and wherein in the step of applying, the card number and the user-identification data and the physical-identification data are applied to the card; and wherein the step of producing transformed data includes transforming the user-identification data.

7. The method of claim 5 wherein the step of obtaining includes collecting at least one of fingerprint data, voiceprint data, and signature data, and converting said data to digital form.

8. The method of claim 7 comprising the additional step of encoding said data in substantially irreversible manner following collection thereof.

* * * * *